(12) United States Patent
Drawert et al.

(10) Patent No.: US 7,233,798 B2
(45) Date of Patent: Jun. 19, 2007

(54) METHOD AND APPARATUS FOR DETERMINING LOCATION OF A REMOTE UNIT USING GPS

(75) Inventors: Bruce M. Drawert, Arlington Heights, IL (US); Audrey Longhurst, Seattle, WA (US)

(73) Assignee: Motorola, Inc., Schaumburg, IL (US)

( * ) Notice: Subject to any disclaimer, the term of this patent is extended or adjusted under 35 U.S.C. 154(b) by 494 days.

(21) Appl. No.: 10/260,909

(22) Filed: Sep. 30, 2002

(65) Prior Publication Data

US 2004/0203876 A1 Oct. 14, 2004

(51) Int. Cl.
*H04Q 7/20* (2006.01)

(52) U.S. Cl. .............. 455/456.1; 455/456.2; 455/456.4; 455/456.3; 455/414.2; 455/422.1; 455/414.4; 342/357.06; 342/357.01; 342/357.02; 342/357.03; 342/352

(58) Field of Classification Search .......... 455/456.1, 455/427, 429, 12.1, 457, 404.2, 414.4, 440, 455/456.2, 456.4, 456.5, 456.3, 414.2, 422.1; 701/207, 201; 342/357.06, 355, 357.01, 342/357.02, 357.03
See application file for complete search history.

(56) References Cited

U.S. PATENT DOCUMENTS

| 5,557,284 | A | * | 9/1996 | Hartman ............. 342/357.03 |
| 5,680,313 | A | * | 10/1997 | Whittaker et al. ........ 701/300 |
| 5,841,396 | A | | 11/1998 | Krasner |
| 5,949,812 | A | * | 9/1999 | Turney et al. ............ 375/130 |
| 6,040,798 | A | * | 3/2000 | Kinal et al. .......... 342/357.01 |
| 6,208,290 | B1 | | 3/2001 | Krasner |
| 6,266,533 | B1 | * | 7/2001 | Zadeh et al. ............ 455/456.2 |
| 6,272,316 | B1 | * | 8/2001 | Wiedeman et al. ........ 455/13.1 |
| 6,438,382 | B1 | | 8/2002 | Boesch et al. |
| 6,509,869 | B2 | * | 1/2003 | Aoyama ............... 342/357.13 |
| 6,646,594 | B1 | * | 11/2003 | Barber et al. ........ 342/357.02 |
| 6,801,778 | B2 | * | 10/2004 | Koorapaty et al. ...... 455/456.1 |
| 6,826,473 | B1 | * | 11/2004 | Burch et al. ............. 701/207 |
| 2001/0014604 | A1 | * | 8/2001 | Kingdon et al. .......... 455/427 |
| 2002/0077103 | A1 | * | 6/2002 | Bonta ...................... 455/436 |
| 2002/0149515 | A1 | * | 10/2002 | Alanen et al. .......... 342/357.1 |
| 2003/0058161 | A1 | * | 3/2003 | Ring ....................... 342/355 |
| 2003/0142523 | A1 | * | 7/2003 | Biacs ........................ 365/1 |
| 2003/0146349 | A1 | * | 8/2003 | Maeda et al. .......... 244/158 R |
| 2003/0165186 | A1 | * | 9/2003 | Kohli et al. ............... 375/150 |
| 2004/0072576 | A1 | * | 4/2004 | Nuutinen et al. ....... 455/456.1 |
| 2004/0160909 | A1 | * | 8/2004 | Sheynblat ................. 370/328 |

FOREIGN PATENT DOCUMENTS

WO WO 02/50562 A1 6/2002

\* cited by examiner

*Primary Examiner*—Cong Van Tran
*Assistant Examiner*—Khai Nguyen

(57) ABSTRACT

To address the need for faster location determination by GPS-equipped units, this application describes embodiments of the present invention that provide GPS-assist data to a remote unit (110) that is determining its location. This GPS assist data is relative to a central point of a grid element that contains the particular remote unit. The grid element is a geographical area within which a predetermined number of GPS satellites are viewable from anywhere within the grid element. By providing GPS-assist data for a grid element, the remote unit receives GPS-assist data sufficiently local in nature to help it determine its location more quickly. Also, because there are significantly fewer grid elements than cell sites over a region such as the US, the maintenance of current GPS-assist data on a grid element basis requires less network bandwidth than it would on a cell site basis.

23 Claims, 3 Drawing Sheets

300

| CELL ID | CELL ID LATITUDE | CELL ID LONGITUDE | ASSOCIATED GRID ELEMENT |
|---|---|---|---|
| 1122334455 | +48.54100 | −100.75000 | G12 |
| 2244668899 | +27.04780 | −69.69610 | G254 |
| ... | ... | ... | ... |
| 5566114499 | +42.06780 | −88.05061 | G78 |
| 3344551122 | +42.32218 | −87.96455 | G78 |

400

| CELL ID | CELL ID LATITUDE | CELL ID LONGITUDE | ASSOCIATED GRID ELEMENT |
|---|---|---|---|
| G1 | +49.00000 | −124.75000 | Sat1data, Sat2data, Sat3data, etc. |
| G2 | +49.00000 | −122.69610 | Sat1data, Sat2data, Sat3data, etc. |
| ... | ... | ... | ... |
| G1199 | 0 | 0 | 0 |
| G1200 | 0 | 0 | 0 |

# METHOD AND APPARATUS FOR DETERMINING LOCATION OF A REMOTE UNIT USING GPS

FIELD OF THE INVENTION

The present invention relates generally to GPS location determination and, in particular, to determining the location of remote units in wireless communication systems using GPS.

BACKGROUND OF THE INVENTION

GPS receivers normally determine their position by computing relative times of arrival of signals transmitted simultaneously from a multiplicity of GPS (i.e., GPS/NAVSTAR) satellites. These satellites transmit, as part of their message, both satellite positioning data and GPS-assist data, such as clock timing or "ephemeris" data. The process of searching for and acquiring GPS signals, reading the ephemeris data for a multiplicity of satellites and computing the location of the receiver from this data is time consuming, often requiring several minutes. In many cases, this lengthy processing time is unacceptable, particularly in emergency situations where location is being determined for a 911 dispatch center.

There are two principal functions of GPS receiving systems: (1) computation of the pseudoranges to the various GPS satellites, and (2) computation of the position of the receiving platform using these pseudoranges and satellite timing and ephemeris data. The pseudoranges are simply the time delays measured between the received signal from each satellite and a local clock. The satellite ephemeris and timing data is extracted from the GPS signal once it is acquired and tracked. As stated above, collecting this information normally takes a relatively long time (30 seconds to several minutes) and must be accomplished with a good received signal level in order to achieve low error rates.

Virtually all known GPS receivers utilize correlation methods to compute pseudo-ranges. These correlation methods are performed in real time, often with hardware correlators. GPS signals contain high rate repetitive signals called pseudorandom (PN) sequences. The code sequences belong to a family known as Gold codes. Each GPS satellite broadcasts a signal with a unique Gold code.

For a signal received from a given GPS satellite, following a down-conversion process to baseband, a correlation processor multiplies the received signal by a stored replica of the appropriate Gold code contained within its local memory, and then integrates, or low-pass filters, the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts in order to maintain a high correlation output.

The correlation acquisition process is very time consuming, especially if received signals are weak. To improve acquisition time, many GPS receivers utilize many correlators (even thousands potentially) that allow a parallel search for correlation peaks. However, the need to improve location determination time still exists, particularly in the wireless environment with issuance of the E911 regulations by the FCC in the US.

DETAILED DESCRIPTION OF EMBODIMENTS

To address the need for faster location determination by GPS-equipped units, this application describes embodiments of the present invention that provide GPS-assist data to a remote unit that is determining its location. This GPS assist data is relative to a central point of a grid element that contains the particular remote unit. The grid element is a geographical area within which the same 12 or more GPS satellites are viewable from anywhere within the grid element. (The actual number visible at any one time is dependent on the particular placement of the satellites in the GPS constellation. Therefore, a grid element area has a potential shared visibility of 12 or more satellites at opportunistic moments.) By providing GPS-assist data for a grid element, the remote unit receives GPS-assist data sufficiently local in nature to help it determine its location more quickly. Also, because there are significantly fewer grid elements than cell sites over a region such as the US, the maintenance of current GPS-assist data on a grid element basis requires less network bandwidth than it would on a cell site basis.

Figure 1:
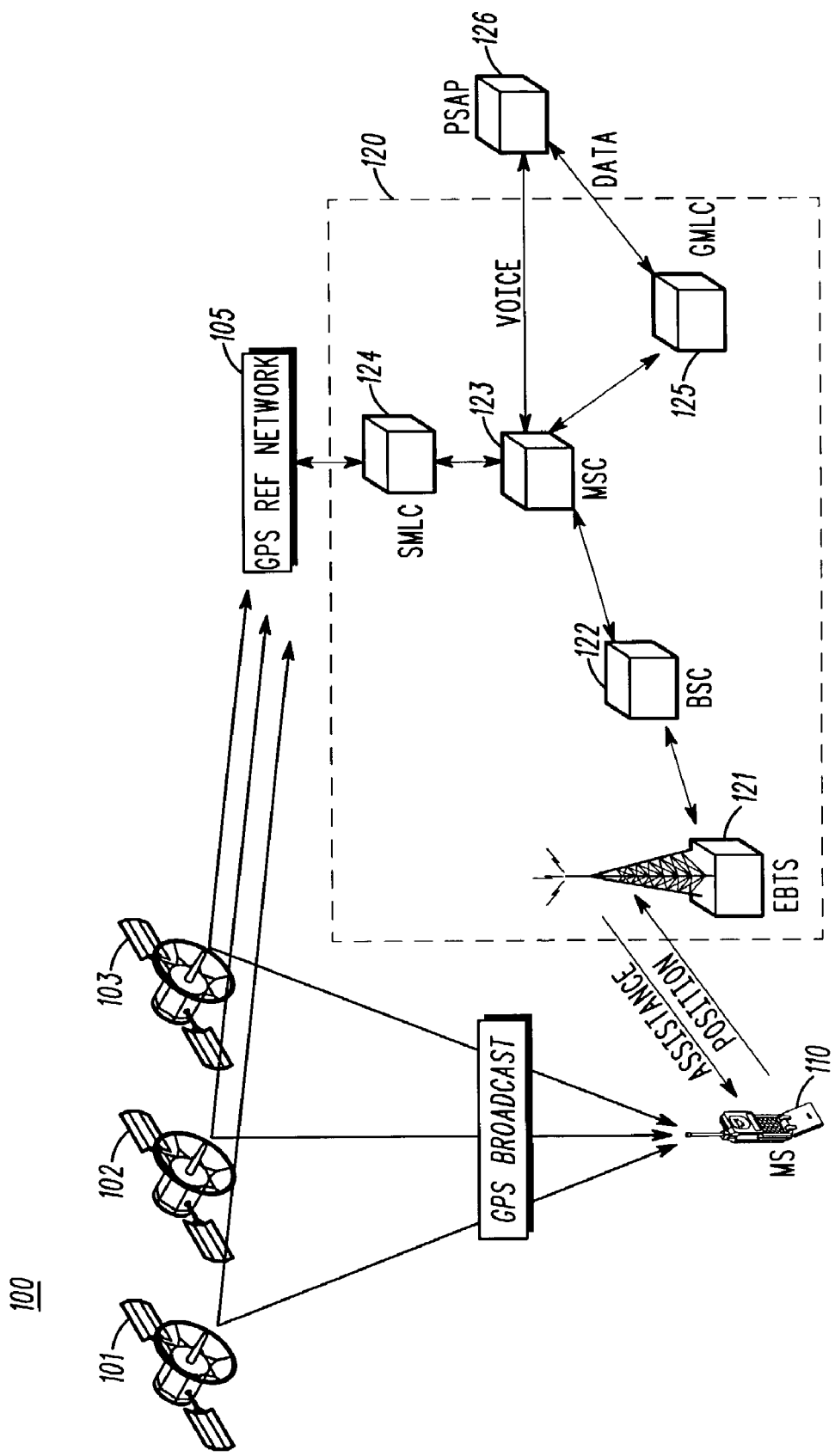
FIG. 1 is a depiction of a wireless communication system in accordance with an embodiment of the present invention.

The disclosed embodiments can be more fully understood with reference to FIGS. 1-5. FIG. 1 is a depiction of a communication system 100 in accordance with an embodiment of the present invention. System 100 comprises an "iDEN" communication system, commercially available from Motorola, Inc. of Schaumburg, Ill., a constellation of Global Positioning System (GPS) satellites (represented by satellites 101-103), a GPS reference network, and a public safety answering point (PSAP). PSAP 126 comprises a public safety dispatch center, such as a 911 call center. GPS reference network 105 comprises a network such as a Global Locate, Inc. network. Mobile station (MS) 110 and radio access network (RAN) 120 represent the "iDEN" communication system. However, the present invention is not limited to a particular wireless technology. For example, in alternate embodiments, communication system 100 may be architected to utilize other communication system protocols such as, but not limited to, those in TETRA, GSM, CDMA, and UMTS systems.

RAN 120 comprises enhanced base transceiver system (EBTS) 121, base site controller (BSC) 122, mobile switching center (MSC) 123, serving mobile location center (SMLC) 124, and gateway mobile location center (GMLC) 125. RAN 120 provides wireless service to MS 110. However, the present invention is not limited to remote units or communication units that are mobile phones or necessarily wireless. For example, such a unit may comprise a GPS-equipped computer wirelessly connected to RAN 120 or a GPS-equipped computer connected to RAN 120 via the Internet.

Figures 2, 3, 4:
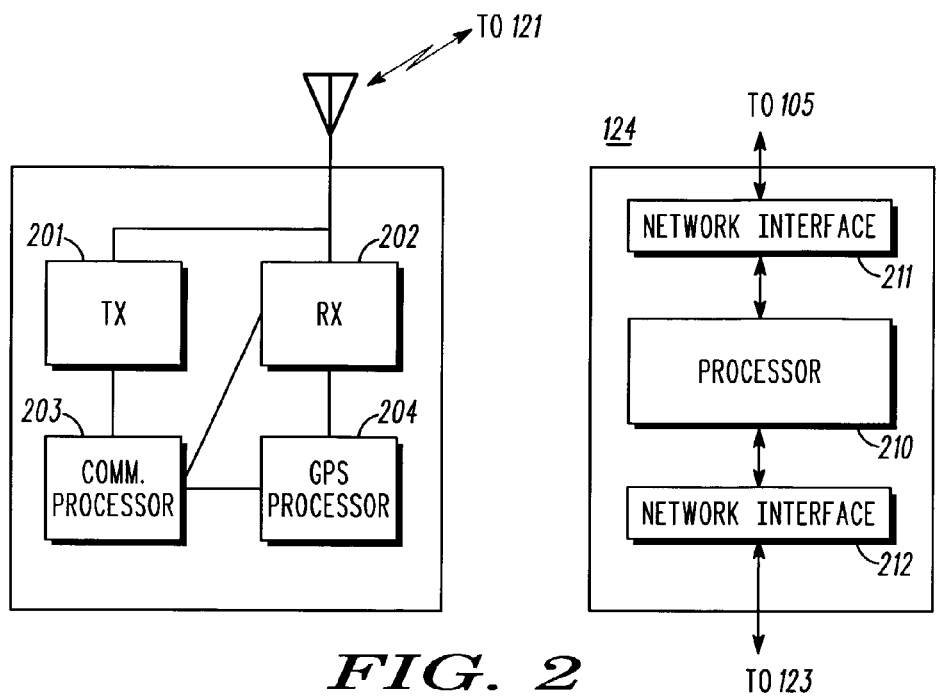
FIG. 2 is a block diagram depiction of a mobile station and a serving mobile location center (SMLC) in accordance with an embodiment of the present invention.
FIG. 3 is an example of a table used by an SMLC in accordance with an embodiment of the present invention.
FIG. 4 is an example of a table used by an SMLC in accordance with an embodiment of the present invention.

Those skilled in the art will recognize that FIG. 1 does not depict all of the network equipment and equipment components necessary for system 100 to operate. FIG. 1 only depicts a simplified diagram of those system entities particularly relevant to the description of embodiments of the present invention. Likewise, FIG. 2 depicts a simplified diagram of those components of an MS and SMLC particularly relevant to the description of embodiments of the present invention. MS 110 comprises transmitter 201, receiver 202, communication processor 203, and GPS processor 204. SMLC 124 comprises processor 210, network interface 211, and network interface 212.

Those skilled in the art are aware of the many ways each of these entities and components can be implemented and/or purchased from wireless communications companies such as "MOTOROLA." Processors, for example, typically comprise components such as microprocessors and/or digital signal processors, memory, and/or logic circuitry designed to implement algorithms that have been expressed in circuitry and/or as computer instructions. Furthermore, processors are often coupled with network interfaces in order to communicate with other devices via data communication networks and/or dedicated communication links. Given an algorithm, a logic flow, or a messaging flow, those skilled in the art are aware of the many design and development techniques available to implement a processor that performs the specified logic and communicates via a network interface as required. Moreover, those skilled in the art will recognize that the SMLC aspect of the present invention may be implemented in and across various physical components of RAN 120, not just in a dedicated SMLC.

Transmitters, receivers, and processors as used in MSs are common and well known in the art. Moreover, receiving GPS signaling and determining location (as by a GPS processor) are also common and well known in the art. In a first embodiment of the present invention, a known "iDEN" MS is adapted using known communications design and development techniques to implement the logic of the present invention. Likewise, in a first embodiment of the present invention, a known SMLC is adapted using known communications design and development techniques to implement the logic of the present invention.

Operation of communication system 100 occurs substantially as follows in accordance with the first embodiment of the present invention. SMLC 124 obtains from GPS reference network 105 updated GPS-assist data associated with a central point of a grid element. The grid element is a geographical area within which the same 12 or more GPS satellites are viewable from any point within the grid element. For example, a grid element can be determined by applying a mask angle to a location's level (i.e., unobstructed) horizon. In the 1994 Federal Radionavigation Plan, design guidelines are presented which show that the USCG DGPS Navigation Service is permitted to create baseline distances (user-to-station) using a 7.5-degree mask angle, which represents more than 400 kilometers of separation user-to-station. The 7.5-degree mask gives greater than 9 shared-view satellites.

The first embodiment of the present invention applies a one-degree mask, to enable the sharing of more than 12 satellites (i.e., these satellites are above a location's level horizon, but not necessarily unobstructed). This one-degree mask means that a cell tower needs to be associated with a pre-determined grid element center, which is not significantly further than 75 kilometers away. (Note that this will vary with latitude. 75 km is an approximation based on the latitude of the mid-continental United States.) Thus, a square grid element should be about 150 kilometers by 150 kilometers in size. Therefore, the geographical region serviced by communication system 100 would be over-laid with grid elements, 150 kilometers square, sufficient to cover the region. However, in alternative embodiments of the present invention, grid elements need not be square or even polygonal. After all, in reality, grid elements are surfaces (not just 2-dimensional shapes) curved, at least slightly, as they cover a portion of the earth's surface.

FIGS. 3 and 4 are examples of tables used by SMLC 124 in accordance with a first embodiment of the present invention. Table 300 maps the cell ID of each cell site supported to a specific latitude and longitude for that cell and maps cell IDs to the grid element within which each cell site is located. Table 400 contains the location (latitude and longitude) of a central point for each grid element and the most recent GPS-assist data appropriate for each specific grid element. Thus, via network interface 211, processor 210 of SMLC 124 obtains from GPS reference network 105 updated GPS-assist data for each grid element. In the first embodiment, SMLC 124 updates its GPS-assist data approximately every minute with current data from GPS reference network 105. Frequent updates are needed to prevent the cached data from becoming too stale.

The GPS-assist data includes data such as the satellite orbital parameters (e.g., orbital inclination relative to the equator, longitude of ascending node, argument of perigee, length of semi-major axis, eccentricity, and location of satellite on orbital ellipse at a given time), satellite clock offsets, accurate time/date, grid element center point location, satellite health status, and ionospheric correction parameters. In the first embodiment, the GPS-assist data collected for each grid element by SMLC 124 is tailored for that grid element at that time. For example, only data for those satellites currently viewable by the grid element is collected, and the data that is specific to a particular location is collected with respect to the central point of the grid element (as indicated in table 400). Furthermore, the GPS-assist data of the first embodiment includes the latitude and longitude of the grid element center point, as opposed to the lat./lon. of the cell site or service area, for example. The MS does not need the location of the cell site, since the location of the grid element center point is sufficient.

Figure 5:
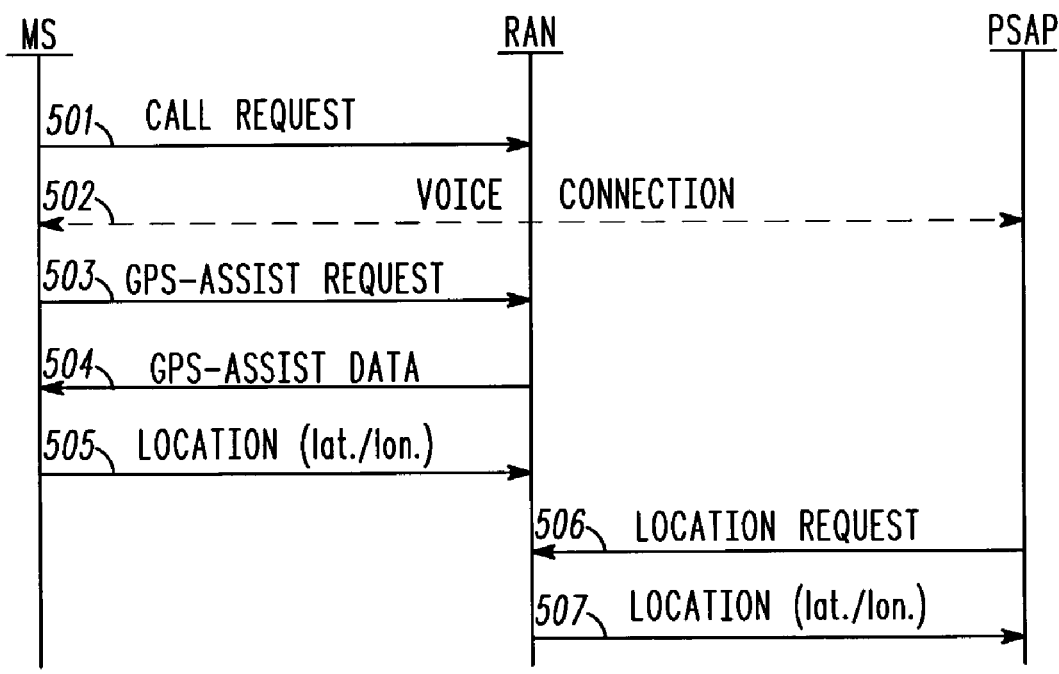
FIG. 5 is a message flow diagram illustrating the communication between system entities and the logic performed by an embodiment of the present invention.

FIG. 5 is a message flow diagram illustrating the communication between system entities and the logic performed by a first embodiment of the present invention. Location determination for E911 applications is triggered when communication processor 203 of MS 110 sends emergency call request 501 to RAN 120. MSC 123 coordinates the setup of a voice connection 502 between MS 110 and PSAP 126. Thus, a user of MS 110 can talk to someone in public safety, such as a 911 dispatcher. In the first embodiment, MS 110 also sends GPS-assist request 503 to RAN 120. Either or both of messages 501 and 503 contain a cell ID of the cell site currently serving MS 110. Thus, this request and the cell ID are forwarded to SMLC 124.

Processor 210 of SMLC 124 receives a GPS assist request via network interface 212 and determines which grid element corresponds to the cell ID. Processor 210 then sends GPS-assist data 504 corresponding to MS 110's grid element to MS 110 via network interface 212. Communication processor 203 receives GPS-assist data 504 via receiver 202 and provides it to GPS processor 204. Processor 204, via receiver 202, is then able to more quickly determine MS 110's location by using the GPS-assist data to acquire and track at least some of its visible GPS satellites. Upon determining the location of MS 110 (e.g., latitude and longitude), processor 204 passes the location to communication processor 203, which sends location message 505 to RAN 120 via transmitter 201. Therefore, when PSAP 126 sends location request 506 to RAN 120, RAN 120 responds with location message 507 indicating MS 110's location to public safety personnel. Thus, message flow 500 is complete.

Message flow 500 represents messaging for the first embodiment of the present invention and is focused on an E911 application. However, other message flows may embody the present invention. For example, in the case of location enhanced services, neither a call request, voice connection, nor GPS assist request may take place, and a PSAP may not be involved. Instead, an MS may receive a location request from an entity, such as a GMLC, or perhaps an MS may receive only GPS-assist data, which would trigger a location determination.

Performing location determination in a wireless system as described herein provides two primary benefits. First, a remote unit is able to determine its location more quickly with the GPS-assist data it receives from the RAN. Second, network traffic and perhaps subscription costs are reduced between the RAN and the GPS reference network by periodically collecting GPS-assist data on a grid element basis rather than a cell site/service area basis. The potentially large number of queries to the GPS reference network by E911 requests and on-going location enhancement services are filtered by the grid element system. For example, all requests originating from the same grid element will receive the same cached GPS-assist data rather than generating individual requests to the GPS reference network. Thus, the GPS-assist data for one grid element can potentially serve millions of units.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically or electrically. The term "program" (or "programming"), as used herein, is defined as a sequence of instructions designed for execution on a computer system. A program, programming, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for determining location of a remote unit using GPS, the method comprising:
   receiving GPS-assist data associated with a location within a grid element, wherein the grid element is a geographical area within which a predetermined number of GPS satellites are viewable when the predetermined number of GPS satellites are viewable from any point within the grid element, wherein a GPS satellite is viewable when the satellite is above a location's level horizon; and
   determining a location of the remote unit by using the GPS-assist data to acquire and track GPS satellites.

2. The method of claim 1, wherein the geographical area is approximately square shaped and wherein the predetermined number of GPS satellites is at least twelve.

3. The method of claim 2, wherein the geographical area is approximately 150 kilometers on each side.

4. The method of claim 1, wherein a size of the geographical area is based on an approximately one-degree mask angle with the central point's level horizon.

5. The method of claim 1, wherein the GPS-assist data comprises data of at least one type selected from the group consisting of satellite orbital parameters, satellite clock offsets, accurate time/date, grid element center point location, satellite health status, and ionospheric correction parameters.

6. The method of claim 5, wherein the satellite orbital parameters comprise data of at least one type selected from the group consisting of orbital inclination relative to the equator, longitude of ascending node, argument of perigee, length of semi-major axis, eccentricity, and location of satellite on orbital ellipse at a given time.

7. The method of claim 1, wherein the GPS-assist data comprises GPS-assist data for GPS satellites currently viewable from the grid element.

8. The method of claim 1, further comprising sending a call request to a radio access network (RAN).

9. The method of claim 8, wherein the call request comprises an emergency call request.

10. The method of claim 8, wherein the call request comprises a cell ID.

11. The method of claim 1, further comprising sending a request for GPS-assist data to a radio access network (RAN).

12. The method of claim 1, further comprising sending the location of the remote unit to a radio access network (RAN).

13. The method of claim 1, wherein the location comprises a latitude and longitude.

14. The method according to claim 1, wherein receiving GPS-assist data associated with a location within a grid element further comprises receiving from a land-based communications network GPS-assist data associated with the location within the grid element.

15. A communication unit comprising:
   a receiver
   a communication processor, coupled to the receiver, adapted to receive via the receiver GPS-assist data associated with a location within a grid element, wherein the grid element is a geographical area within which a predetermined number of GPS satellites are viewable when the predetermined number of GPS satellites are viewable from any point within the grid element, wherein a GPS satellite is viewable when the satellite is above a location's level horizon; and
   a GPS processor, coupled to the receiver and the communication processor, adapted to determine a location of the remote unit by using the GPS-assist data to acquire and track GPS satellites via the receiver.

16. The communication unit according to claim 15, wherein the GPS-assist data is transmitted from a land-based communications network.

17. A method for facilitating location determination for a remote unit using GPS, the method comprising:
   obtaining from a GPS reference network updated GPS-assist data associated with a central point of a grid element, wherein the grid element is a geographical area within which a predetermined number of GPS satellites are viewable when the predetermined number of GPS satellites are viewable from any point within the grid element, wherein a GPS satellite is viewable when the satellite is above a location's level horizon; and
   receiving a GPS assist request that indicates GPS-assist data associated with the grid element is requested; and
   sending GPS-assist data associated with a central point of the grid element.

18. The method of claim 17, wherein the GPS assist request comprises a cell ID and wherein the method further comprises determining the cell ID is associated with the grid element.

19. The method of claim 17, further comprising periodically obtaining from the GPS reference network updated GPS-assist data associated with a central point of the grid element.

20. The method of claim 19, wherein periodically obtaining comprises obtaining approximately once per minute.

21. The method according to claim 17, wherein the GPS reference network is a land-based network.

22. A serving mobile location center (SMLC) comprising:
   a first network interface;
   a second network interface; and
   a processor, coupled to the first and second network interfaces, adapted to obtain, from a GPS reference network via the first network interface, updated GPS-assist data associated with a central point of a grid element, adapted to receive via the second network interface a GPS assist request that indicates GPS-assist data associated with the grid element is requested, and adapted to send via the second network interface GPS-assist data associated with a central point of the grid element, wherein the grid element is a geographical area within which a predetermined number of GPS satellites are viewable when the predetermined number of GPS satellites are viewable from any point within the grid element, wherein a GPS satellite is viewable when the satellite is above a location's level horizon.

23. The serving mobile location center according to claim 22, wherein the GPS reference network is a land-based network.

* * * * *